2,952,921
DRYING OF WET CARBON BLACK PELLETS

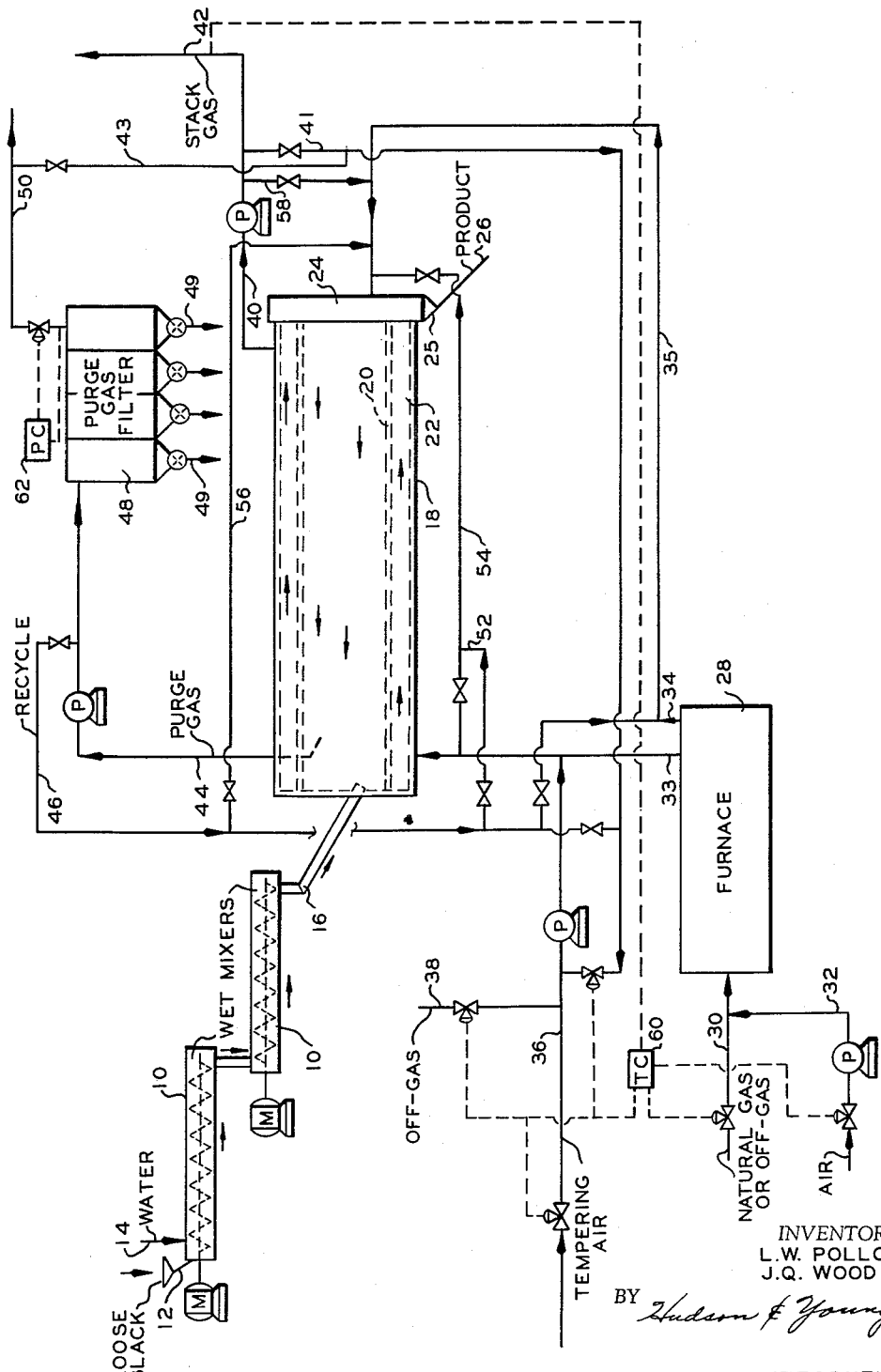

James Q. Wood and Lyle W. Pollock, Bartlesville, Okla., assignors to Phillips Petroleum Company, a corporation of Delaware Filed Aug. 26, 1957, Ser. No. 680,272

14 Claims. (Cl. 34—36)

This invention relates to an improved process for drying wet carbon black pellets.

In the wet pelleting of carbon black as practiced commercially the wet pellets emerge from the forming step containing from about 45 to 55 weight percent of water and generally about 50 percent. It is necessary to dry the pellets before storage or shipment and the effluent pellets from the pelleting mills are passed thru a dryer where they are contacted with a purge gas comprising combustion products tempered with air. This purge gas has a relatively high $O_2$ concentration and, at purge gas temperatures in the range of 300 to 600° F. inside the dryer, this highly oxidizing atmosphere has an adverse effect on black properties, for use in rubber compounding, particularly. The purge gas makes only one pass thru the dryer and is vented to the atmosphere. Purge gas is conventionally made by burning natural gas at a flame temperature of about 3000 to 3400° F. and the resulting combustion gas is tempered with a large excess of air (about 400 to 500%) so that the resulting purge gas has an $O_2$ concentration in the range of about 15 to 18 percent by volume.

Our invention is concerned with a process for drying wet pellets which avoids the deleterious effects of $O_2$ on the resulting pellets and which conserves fuel for the drying process. One aspect of the invention comprises a recycling of purge gas from the dryer to the effluent from the combustion step as tempering gas thereby building up the $H_2O$ concentration in the purge gas and reducing the $O_2$ concentration therein so as to reduce the effect of $O_2$ on the carbon black being dried. By recycling the $H_2O$-enriched effluent from the dryer, the concentration of water vapor in the purge gas may be built up to 45 to 60 volume percent as compared to 10 to 15 volume percent of $H_2O$ in the once-thru purge gas processes in current use.

Another aspect of the invention comprises burning off-gas from a furnace black process with air to provide combustion gas for the drying step, the off-gas burning at a temperature in the range of about 1800 to 2100° F., therefore requiring much less tempering air than combustion gas from the burning of natural gas and, hence, providing a drying gas of considerably lower $O_2$ concentration. By this method the $O_2$ concentration in the purge gas is reduced by about 35 to 40% and the process utilizing this aspect of the invention reduces the adverse effects of after-treating the black in the dryer by proportionate amounts. Where the purge gas normally contains 15 to 18 volume percent $O_2$, the $O_2$ concentration is thereby reduced to less than about 12 volume percent.

Another aspect of the invention comprises tempering the combustion gas produced by burning off-gas from a furnace black process with similar off-gas so that the resulting purge gas is substantially free of $O_2$. Since off-gas from furnace black processes is readily available at a pelleting plant and is waste gas, use of this gas not only improves the pelleted product, but also renders the drying process substantially more economical and conserves natural gas.

Off-gas from a furnace black process is available as it is recovered from the carbon black collection system of the furnace black process at a temperature of about 400° F. and has an average composition on a water-free basis as follows:

| | Percent |
|---|---|
| $CO_2$ | 5 |
| $H_2$ | 10 |
| $CO$ | 10 |
| $CH_4$ | 1 |
| $N$ | 70 |

The off-gas contains about 40% water.

A more complete understanding of the invention may be had by reference to the accompanying schematic drawing which is a flow diagram illustrating the various aspects of the process. Referring to the drawing, a series of wet mixers or pug mills 10 receive loose black from a furnace black process recovery system thru feed line 12 and this loose black is pugged with water admitted thru line 14 to a first mixer. The wet pelleting process is conventional and requires no further description.

The wet pellets containing about 50% water are passed thru line 16 into dryer 18 which comprises an inner rotatable drum 20 which is surrounded by jacket or annulus 22, formed between the shell and drum 20, surrounding the drying drum for circulation of hot gas therethru to heat the revolving drum. Dryed pellets are collected in hood 24 and passed thru hopper 25 to product line 26. Purge gas and heating gas for the drying process are produced by burning a suitable fuel in furnace 28. Natural gas or off-gas is passed thru line 30 admixed with air from line 32 into furnace 28 under substantially complete combustion conditions and the effluent combustion gas is taken off in two streams, one thru line 33 which passes to the annulus surrounding dryer drum 20, and the other thru lines 34 and 35 to the outlet end of drying drum 20. The gas in lines 33 and 34 is at a substantially higher temperature than required for the drying process and must be tempered with a suitable gas. In one aspect of the process, tempering air is passed thru line 36 into line 33 so as to reduce the temperature of the combustion gas to the required level of about 400 to 700°.

The amount of oxygen in the gas passing thru the jacket of the dryer is not critical because of the fact that there is no direct contact of this gas with the carbon black unless a portion of the effluent gas from the jacket is passed to the inside of the dryer, in which case tempering with off-gas from line 38 is beneficial to the process. It is also feasible and advantageous in the process to recycle heating gas from the jacket of the dryer thru lines 40 and 41 to line 36 for tempering the combustion gas in line 33. The gas in line 40 which is not recycled is passed to atmosphere thru stack 42.

Purge gas admitted to the interior of rotating drum 20 thru line 35 passes thru the dryer countercurrently to the movement of pellets therethru and sweeps out water vapor removed from the pellets in the heating drum and the effluent purge gas containing purged water vapor is passed thru line 44 to recycle line 46 and to filters 48. Purge gas filters 48 are conventional bag filters which recover carbon black dust picked up by the purge gas in the dryer and deliver the dust thru lines 49 for return to the pelleting process or other suitable disposal. The clean off-gas is vented thru line 50. Recycle line 46 conveys water vapor-enriched purge gas to line 35 for recycle thru the interior of the dryer or to line 41 for recycle to the dryer annulus. It is also feasible to pass a portion of the recycle in line 46 thru line 52 to line 54 for recycle to the interior of the dryer. Lines 52 and 54 facilitate control of temperature and $O_2$ concentration of the purge gas introduced to the dryer.

Another method of recycling purge gas is thru line 56 which connects line 46 with line 35. Line 58 connects line 40 with the interior of a dryer thru line 35 and provides for passage of effluent gas from the jacket of the dryer to the interior thereof as purge gas. Passage of effluent gas from the jacket of the dryer to the purge gas line is useful in controlling temperature and also in controlling the $O_2$ content of the purge gas.

A temperature controller 60 is sensitive to the temperature of the stack gas in line 42 and controls motor valves in the feed lines to furnace 28 as well as motor valves in the lines admitting tempering gas to the combustion gas in line 33 so as to control the heating effected in the dryer thru the wall of drum 20. A pressure controller 62 is sensitive to the pressure in line 50 between the filters and the control valve to which the instrument is connected and maintains a constant pressure therein by controlling the motor valve in line 50. Gas in line 50 may be recycled to the dryer annulus thru any suitable line such as line 43 leading to line 41. Various other controls may be utilized in the process without materially altering the process of the invention.

An advantage of the invention not previously referred to obtained by recycling a substantial portion of the purge gas reduces the size of the filter system required to clean up the dirty stream of purge gas, inasmuch as the recycled stream may contain the normal concentration of carbon black dust present in the effluent gas from the interior of the dryer and does not require cleaning up. In addition, use of this hot recycle stream for tempering, in lieu of air, substantially reduces fuel requirements. As previously indicated, the principal benefit of the invention lies in the improved quality of the dried black resulting from the reduction in $O_2$ concentration of the purge gas obtained by the various methods described herein.

Certain modifications of the invention will become apparent to those skilled in the art and the illustrative details disclosed are not to be construed as imposing unnecessary limitations on the invention.

We claim:

1. A process for drying wet carbon black pellets which comprises passing said pellets thru a drying zone; contacting said pellets in said drying zone with a hot drying gas at a temperature in the range of about 300 to 600° F. so as to dry said pellets; and maintaining the free-$O_2$ concentration of said drying gas below about 12 volume percent, whereby the moisture content of said pellets is reduced to not more than 1.0 percent by weight.

2. The process of claim 1 wherein said drying gas is substantially devoid of free $O_2$.

3. The process of claim 1 wherein said drying gas contains steam in the range of about 45 to 60 volume percent.

4. A process for drying wet carbon black pellets which comprises passing said pellets thru an elongated cylindrical drum rotating on its horizontal axis; burning a fuel to form hot combustion gas; tempering said combustion gas by mixing same with a tempering gas of low free-oxygen content to form a drying gas having a free-oxygen content below about 12 volume percent; passing said drying gas at a temperature in the range of about 300 to 600° F. thru said drum in contact with said pellets so as to dry same to a moisture content of not more than 1.0 percent by weight; and recovering dried pellets from said drum.

5. The process of claim 4 wherein said tempering gas comprises off-gas from a furnace black process.

6. The process of claim 5 wherein said fuel comprises off-gas from a furnace black process.

7. The process of claim 4 wherein said tempering gas comprises effluent gas from said drum.

8. The process of claim 4 including the step of passing hot drying gas thru an annulus surrounding and adjacent said drum so as to heat the wall of said drum.

9. A process for drying wet carbon black pellets which comprises passing said pellets thru an elongated cylindrical drum rotating on its horizontal axis; burning a fuel in a furnace to produce hot combustion gas; passing a first stream of said combustion gas thru said drum in contact with said pellets; passing a second stream of said combustion gas in contact with the outside of said drum to heat same; and tempering said first stream with a tempering gas of low free-oxygen content before passing same to said drum to maintain the free-oxygen concentration in said first stream below about 12 volume percent, whereby said pellets are dried to a water content of not more than 1.0 percent by weight.

10. The process of claim 9 wherein said tempering gas comprises off-gas from a furnace black process.

11. The process of claim 9 wherein a portion of the effluent gas from inside said drum is recycled.

12. The process of claim 9 wherein a portion of the effluent from the outside of said drum is recycled.

13. A process for drying wet carbon black pellets which comprises passing said pellets thru an elongated cylindrical drum rotating on its horizontal axis; burning off-gas in a furnace to produce hot combustion gas having a temperature below about 2100° F.; passing a first stream of said combustion gas thru said drum in contact with said pellets; passing a second stream of said combustion gas in contact with the outside of said drum to heat same; and tempering said first stream with a tempering gas which maintains the free-$O_2$ concentration of said first stream below about 12 volume percent before passing same to said drum, whereby the moisture content of said pellets is reduced to not more than 1.0 percent by weight.

14. The process of claim 13 wherein the tempering gas comprises off-gas from a furnace black process.

References Cited in the file of this patent

UNITED STATES PATENTS

| | | |
|---|---|---|
| 2,538,482 | Studebaker | Jan. 16, 1951 |